United States Patent [19]

Eto et al.

[11] Patent Number: 5,177,607
[45] Date of Patent: Jan. 5, 1993

[54] METHOD AND APPARATUS FOR MEASURING VELOCITY OF FLUID

[75] Inventors: Yoshihisa Eto; Takeshi Miyamoto, both of Higashimatsuyama, Japan

[73] Assignee: Zexel Corporation, Tokyo, Japan

[21] Appl. No.: 748,886

[22] Filed: Aug. 23, 1991

[30] Foreign Application Priority Data

Aug. 27, 1990 [JP] Japan .................. 2-225568
Sep. 11, 1990 [JP] Japan .................. 2-240642

[51] Int. Cl.⁵ .............................................. H04N 7/18
[52] U.S. Cl. ..................................... 358/107; 358/125
[58] Field of Search ............... 358/107, 99, 105, 136, 358/125, 126; 382/1

[56] References Cited

U.S. PATENT DOCUMENTS

| | | | |
|---|---|---|---|
| 4,297,893 | 11/1981 | Weinstein | 358/107 X |
| 4,320,415 | 3/1982 | Jones | 358/105 |
| 4,396,943 | 8/1983 | Lord et al. | 358/107 |
| 4,554,832 | 11/1985 | Hasegawa et al. | 358/107 X |
| 4,837,708 | 6/1989 | Wright | 358/107 X |
| 4,928,176 | 5/1990 | Schmidt et al. | 358/107 X |
| 4,937,878 | 6/1990 | Lo et al. | 382/1 |
| 4,947,247 | 8/1990 | Farver | 358/107 |

OTHER PUBLICATIONS

Journal of the Flow Visualization Society of Japan vol. 9, No. 34, pp. 379–382.

Primary Examiner—Victor R. Kostak
Attorney, Agent, or Firm—Pollock, Vande Sande & Priddy

[57] ABSTRACT

In a method for measuring the velocity of a fluid visualized by the injection of tracer particles, the particle pathline images are imaged by the use of an interlaced scanning type television camera and logical products between pairs of field pictorial image data derived form a frame pictorial image of the output from the television camera is calculated. The correspondence among the particle pathline images of the field pictorial image data is determined on the basis of the logical products. The pairs of field pictorial image data can be obtained from a set of image pickup apparatuses whose exposure time periods are controlled so as to overlap partially.

15 Claims, 8 Drawing Sheets

FLOW DIRECTION

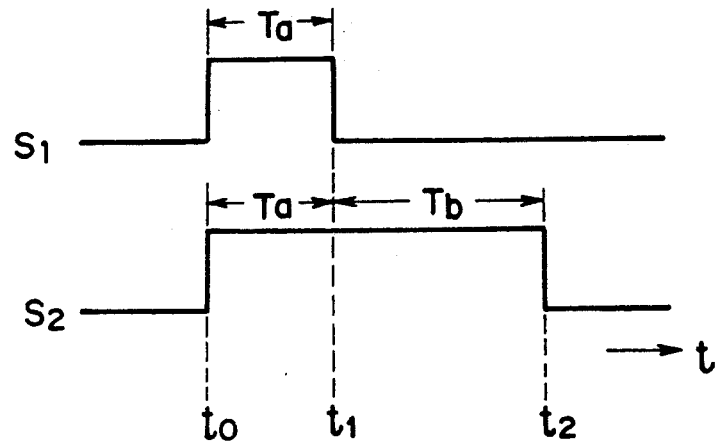
FIG. 8A
FIG. 8B
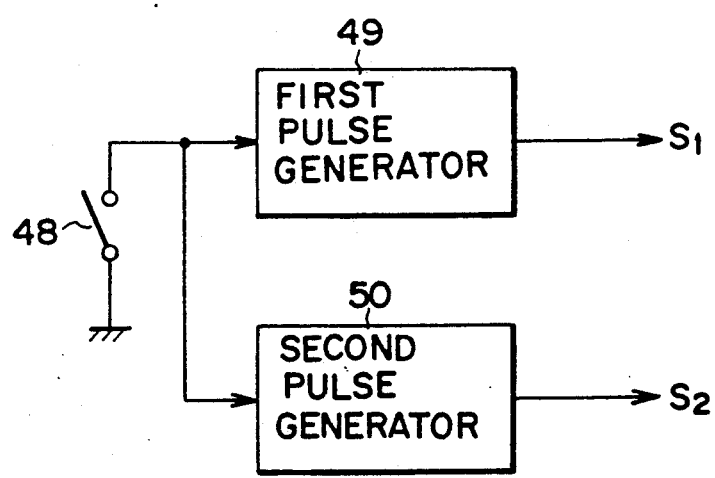
FIG. 9

METHOD AND APPARATUS FOR MEASURING VELOCITY OF FLUID

BACKGROUND OF THE INVENTION

1. Field of the Invention

The present invention relates to a method and apparatus for measuring the velocity in a two-dimensional field of view of a fluid in a flow field by processing television picture information of a flow field visualized by the tracer particle injection method.

2. Description of the Prior Art

For detecting the velocity distribution of a flow field of, for example, a fluid such as water in a duct, it is well-known to visualize the flow field by injecting particles of nylon or the like into the flow field as tracers. For obtaining velocity information on a flow field visualized in this manner, there has been proposed a method for measuring flow field velocity comprising the steps of obtaining a television video signal corresponding to the condition of the visualized flow field by means of a television camera, making two frame signals from the two field signal components composing a frame of the television picture, subjecting particle pathline images in pictorial images corresponding to the frame signals to a thinning process, deriving the correspondence between the particle pathline images of the two pictorial images from the angle of inclination and the length of the thin lines obtained, and determinating the velocity in the flow field from the difference in location between the two pathline images formed by one and the same particle (Journal of the Flow Visualization Society of Japan, Vol. 9, No. 34, Pages 379 to 382). Since the proposed method needs only one television picture frame, it is more widely applicable than one which needs two or more frames.

The proposed method includes a step of obtaining the angle of inclination and the length of each skeleton line obtained by subjecting the particle pathline images to the thinning operation and a tracking step for determining the pathline of the fluid in the flow field. Therefore, the proposed method has the disadvantage that the result of the tracking operation is markedly affected by any noise superposed on the pictorial image, whereby erroneous velocity is apt to arise in the result of the measurement.

For obtaining reliable result in this case, it is necessary to establish an excellent lighting condition for visualizing the flow field, and moreover, to use tracer particles of a diameter falling within a predetermined range. This latter need results from the fact that the lengths of the thin lines obtained by subjecting the particle pathline images to thinning vary with the diameter of the tracer particles even if their pathline images are identical in length. Accordingly, it is necessary for realizing the proposed method to overcome the problems described above.

Theoretically, it is possible to use Hough transformation for obtaining the angle of inclination and the length of the particle pathline images. In fact, however, it is difficult to use Hough transformation because an impractically long processing time is needed. Furthermore, it may be difficult to obtain a reliable measurement result due to the effect of the noise contained in the pictorial image being processed.

SUMMARY OF THE INVENTION

It is an object of the present invention to provide an improved method and apparatus for measuring the velocity of a fluid within a field of view in a flow field.

It is another object of the present invention to provide a method and apparatus for measuring the velocity of a fluid within a field of view, which is capable of measuring the velocity of the fluid reliably even in the presence of noise.

It is a further object of the present invention to provide a method and apparatus for measuring the velocity of a fluid within a field of view, which is capable of measuring the velocity of fluid flowing at high speed in the flow field without any problem.

According to the present invention, in a method for measuring the velocity in a two-dimensional field of view of a fluid in a flow field on the basis of particle pathline image information in the flow field visualized by the injection of tracer particles, the method comprises the steps of obtaining a television video signal by imaging the visualized flow field by the use of an interlace scanning pick-up tube type television camera; calculating logical products between pairs of field pictorial image data derived from a frame pictorial image of the obtained television video signal; determining the correspondence among the particle pathline images of the field pictorial image data on the basis of the logical products obtained in the calculating step; and calculating flow velocity vectors from the pairs of particle pathline images determined by the determining step. A frame integration type CCD video camera is also usable instead of the interlace scanning pick-up tube type television camera.

The visualized flow field is imaged by the interlace scanning pick-up tube type television camera to obtain a pair of field picture signals, by which one frame pictorial image according to the television video signal is formed. First field pictorial image data is obtained on the basis of one field picture signal and second field pictorial image data is obtained on the basis of the other field picture signals. Because of the way in which the interlaced scanning operation is carried out in a television camera of this type, there is some deviation between the scanning time period for obtaining a video signal component for an odd field and that for obtaining a video signal component for an even field and the two periods partially overlap. Thus, the respective particle pathline images in the pictorial image represented by the first field pictorial image data and the corresponding particle pathline images in the pictorial image represented by the second field pictorial image data differ in position by the distance traveled by the tracer particles during the aforesaid time deviation.

Accordingly, in a single frame pictorial image formed by a pair of field pictorial images obtained by the interlace scanning pick-up tube type television camera, one particle pathline image showing the traveling path of a particle partially overlaps with the other pathline image showing the traveling path of the same particle. Thus, it is possible by taking account of the overlap condition among the particle pathline images in one frame pictorial image to find which pathline images are formed by a specific particle. In practice, this can be done by carrying out a logical product operation between a pair of field pictorial image data.

The center of gravity of each of the pairs of particle pathline images is calculated and then a vector showing the movement of the center of gravity is calculated. The direction and speed of the fluid at a point can be determined on the basis of the resulting vector. Furthermore, the distribution of the velocity of the fluid in the flow field can also be determined by conducting the foregoing velocity measurement at many points in the flow field.

According to the foregoing measuring method, it may be difficult to measure the velocity exactly for a high speed flow because the time for the measurement is limited by the television pictorial image sampling period according to NTSC system. Furthermore, an error will arise in the length of the particle pathline image obtained by a vidicon television camera in the case where the traveling speed of the particles in the plane of view is relatively high.

According to another feature of the present invention, to overcome the above mentioned disadvantages, there is provided a measuring system comprising a plurality of shutter type CCD cameras for taking pictorial images of a desired visualized flow field in the same visual field; a controller for controlling the operation of the shutter devices of the CCD cameras so as to cause the exposure time periods of the CCD cameras to partially overlap, and means for obtaining a plurality of pictorial image data corresponding to the respective output signals produced by the CCD cameras.

With this system each of the CCD cameras produces pictorial image data which includes the pathline images resulting from the travel of particles during the activated state of the corresponding shutter device or exposure control means (will be referred to as shutter device). Since a part of the exposure time period of one CCD camera overlaps at least part of the exposure time period of another CCD camera, the state of overlap between one group of pathline images according to one pictorial image data and another group of pathline images according to another pictorial image data depends upon the overlap time of the exposure.

Accordingly, when a plurality of pictorial images obtained by the respective CCD cameras are superposed, the particle pathline images resulting from the travel of a specific particle overlap. The velocity of the fluid in the visualized flow field can also be measured on the basis of the pictorial images obtained by the CCD cameras in a manner similar to the foregoing. Since the desired exposure time can be selected in the case of using CCD cameras, it is possible to correctly measure the velocity of the fluid in the flow field even if the flow speed is relatively high.

The invention will be better understood and other objects and advantages thereof will be more apparent from the following detailed description of preferred embodiments with reference to the accompanying drawings.

BRIEF EXPLANATION OF THE DRAWINGS

FIG. 8A is the waveform of a first control signal for controlling the shutter device of the first pickup apparatus shown in FIG. 7;

FIG. 8B is the waveform of a second control signal for controlling the shutter device of the second image pickup apparatus shown in FIG. 7;

FIG. 9 is a block diagram of the shutter control unit shown in FIG. 7;

DETAILED DESCRIPTION OF PREFERRED EMBODIMENTS

Figure 1:
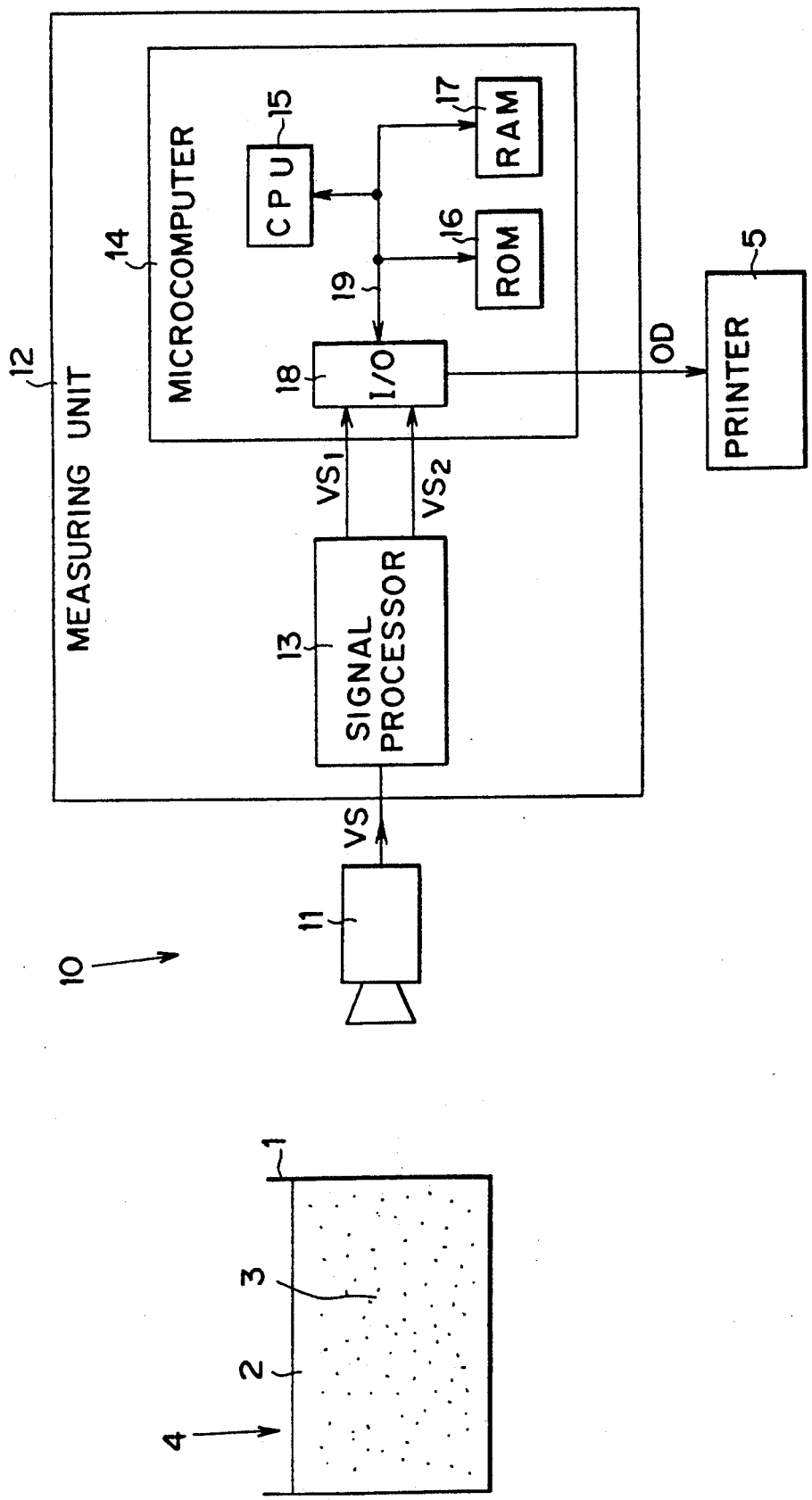
FIG. 1 is a schematic view illustrating an embodiment of a velocity measurement system according to the present invention.

FIG. 1 is a schematic view illustrating an embodiment of a velocity measurement system 10 according to the present invention. The velocity measurement system 10 is arranged to measure the velocity of fluid 2 in a flow field 4 defined in a tank 1 made of transparent glass. The flow field 4 is visualized by injecting tracer particles 3 of, for example, nylon 12 into the fluid 2. For obtaining a television video signal corresponding to the particle pathlines in the visualized flow field 4, the velocity measurement system 10 has a television camera 11 which produces video output signal VS. The video output signal VS is supplied to a measuring unit 12 having a signal processor 13 and a microcomputer 14 and is subjected to a data processing operation by the measuring unit 12 to obtain data on the two-dimensional velocity distribution of the fluid 2 in the flow field 4.

The television camera 11 is of the shutterless image pickup tube type having a 2:1 interlace scanning system and converts the image of the object in its visual field into a video signal by an interlaced scanning operation, whereby the video output signal VS is produced. Each frame of the pictorial image carried by the video output signal VS is composed of a pair of field pictorial images: an odd field pictorial image and an even field pictorial image. The relationship between the odd and even pictorial images is as follows:

In the interlace scanning type television camera 11, an image pickup element such as a photo-electric transducer is scanned along the odd-numbered scanning lines in sequence to obtain an odd field signal component. Then, the image pickup element is scanned along the even-numbered scanning lines in sequence to obtain an even field signal component. The images of tracer particles move on the surface of the image pickup element during the scanning operation because the television camera 11 is of the shutterless type.

Figure 5A:
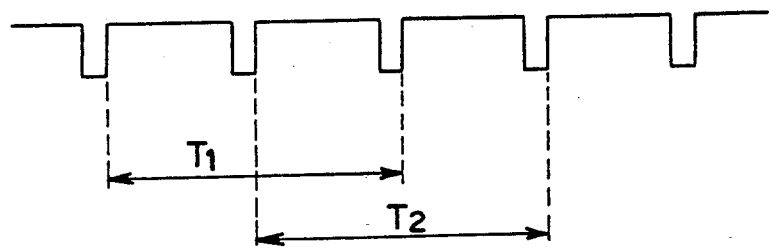
FIG. 5A is the waveform of the vertical synchronizing signal of the television camera shown in FIG. 1.

As shown in FIG. 5A, the interlaced scanning operation for odd-numbered fields is carried out within a 1/30-second time slot $T_1$ in synchronization with a vertical synchronizing signal formed from vertical synchronizing pulses produced every 1/60 second. On the other hand, the interlaced scanning operation for even-numbered fields is carried out within a 1/30-second time slot $T_2$ in synchronization with the vertical synchronizing signal. As will be understood from FIG. 5A, there is 1/60-second overlap period between the time slots $T_1$ and $T_2$.

Figure 5B:
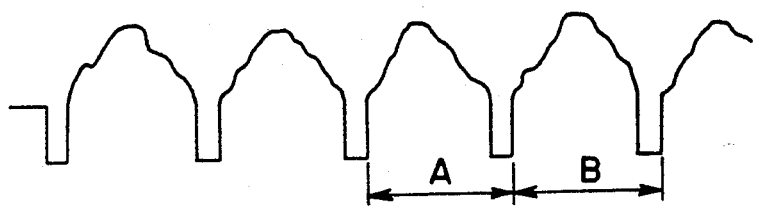
FIG. 5B is the waveform of the video output signal from the television camera.

An odd field picture signal obtained by the scanning operation during the time slot $T_1$ is assigned to a time slot A of the video output signal VS and an even field picture signal obtained by the scanning operation during the time slot $T_2$ is assigned to a time slot B following the time slot A, whereby one frame picture signal of the video output signal VS is formed (FIG. 5B).

Returning to FIG. 1, the video output signal VS is supplied to the signal processor 13 in which it is separated into an odd field video signal $VS_1$ including only the odd field picture signal of the video output signal VS and an even field video signal $VS_2$ including only the even field picture signal thereof. Both the video signals $VS_1$ and $VS_2$ are sent to the microcomputer 14 and are subjected to image processing and measurement of picture parameters to obtain information concerning the velocity of the fluid 2 in the flow field 4.

The microcomputer 14 includes a central processing unit (CPU) 15, read-only memory (ROM) 16, random access memory (RAM) 17 and I/O interface 18, which are interconnected by a bus 19 to form a conventional microcomputer system. The I/O interface 18 receives the odd field and even field video signals $VS_1$ and $VS_2$, and a data processing program 20 for analyzing a television picture carried by the video output signal VS on the basis of both video signals $VS_1$ and $VS_2$ is stored in the ROM 16.

The data processing operation according to the data processing program 20 stored in the ROM 16 will now be explained with reference to FIG. 2.

After the start of the execution of the data processing program 20, the microcomputer 14 is initialized and the operation moves to step 21, in which the odd field video signal $VS_1$ and the even field video signal $VS_2$ are fetched into the microcomputer 14 and are converted into digital form by an analog-digital converter (not shown) in the I/O interface 18 to obtain first digital data $DV_1$ corresponding to the odd field video signal $VS_1$ and second digital data $DV_2$ corresponding to the even field video signal $VS_2$. The operation further moves to step 22, in which the first and second digital data $DV_1$ and $DV_2$ are stored in the RAM 17.

In the following step 23 first pictorial image data $D_1$ is formed as one frame of television picture data on the basis of the first digital data $DV_1$ and second pictorial image data $D_2$ is formed as one frame of television picture data on the basis of the second digital data $DV_2$.

Figure 6A:
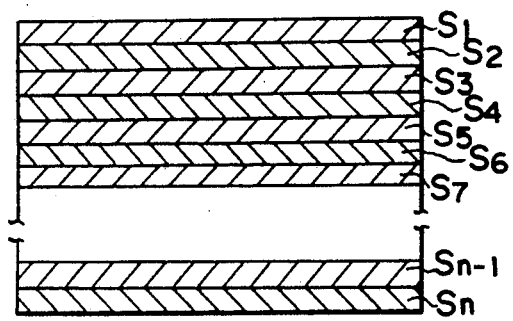
FIG. 6A is a view schematically illustrating the arrangement of the scanning lines of a television picture frame.
Figure 6B:
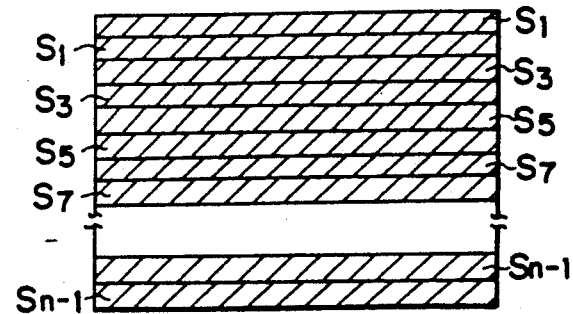
FIG. 6B is a view schematically illustrating an arrangement of the first pictorial image data.
Figure 6C:
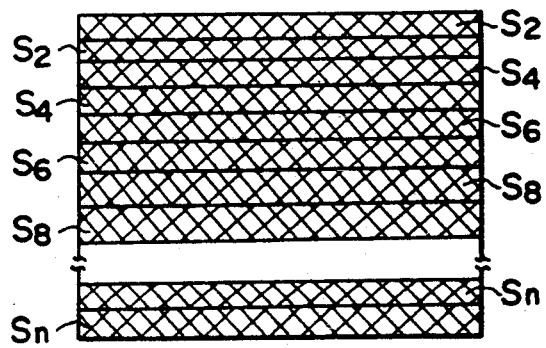
FIG. 6C is a view schematically illustrating an arrangement of the second pictorial image data.

The process for forming these pictorial image data $D_1$ and $D_2$ will be described with reference to FIGS. 6A to 6C. FIG. 6A schematically illustrates the arrangement of the scanning lines on the television picture. As can be seen in this figure, the scanning lines are divides into odd-numbered scanning lines $S_1, S_3, \ldots S_{n-1}$ for obtaining an odd field picture signal and even-numbered scanning lines $S_2, S_4, \ldots S_n$ for obtaining an even field picture signal. The first pictorial image data $D_1$ is formed by replacing the lines of image data corresponding to the even-numbered scanning lines $S_2, S_4, \ldots S_n$ with lines of image data corresponding to the odd-numbered scanning lines $S_1, S_3, \ldots S_{n-1}$, respectively. In this case, the line image data of the odd-numbered scanning lines $S_1, S_3, \ldots S_{n-1}$ remain as they were. As a result, one frame of television picture data reconstructed by the use of only the odd field picture signal can be obtained as the first pictorial image data $D_1$, as illustrated in FIG. 6B. In other words, the odd field picture signal obtained by the scanning operation during $T_1$ of FIG. 5A is assigned to the time slot B shown in FIG. 5B instead of the even field picture signal obtained by the scanning operation during $T_2$.

On the other hand, the second pictorial image data $D_2$ is formed by replacing the lines of image data corresponding to the odd-numbered scanning lines $S_1, S_3, \ldots S_{n-1}$ with lines of image data corresponding to the even-numbered scanning lines $S_2, S_4, \ldots S_n$, respectively. In this case, the line image data of the even-numbered scanning lines $S_2, S_4, \ldots S_n$ remain as they were. As a result, one frame of television picture data reconstructed by the use of only the even field picture signal can be obtained as the second pictorial image data $D_2$, as illustrated in FIG. 6C. In other words, the even field picture signal obtained by the scanning operation during $T_2$ of FIG. 5A is assigned to the time slot A shown in FIG. 5B instead of the odd field picture signal obtained by the scanning operation during $T_1$.

Figure 3A:
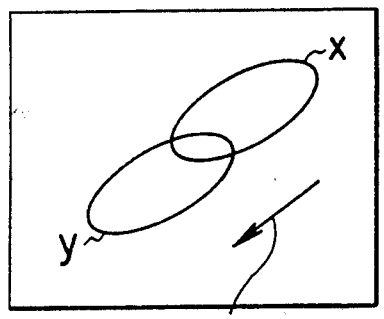
FIG. 3A is a view schematically illustrating the relationship between two pictorial images.
Figure 3B:
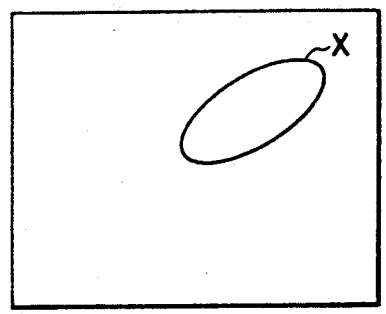
FIG. 3B is a view schematically illustrating the pictorial image according to the first pictorial image data obtained in the microcomputer shown in FIG. 1 as a single image.
Figure 3C:
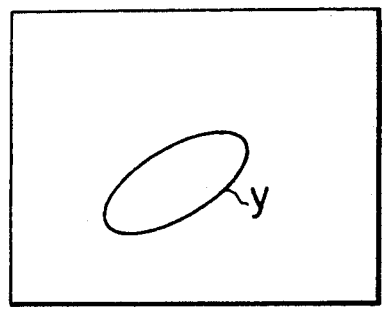
FIG. 3C is a view schematically illustrating the pictorial image according to the second pictorial image data obtained in the microcomputer shown in FIG. 1 as a single image.

The pictorial image x represented by the first pictorial image data $D_1$ is schematically illustrated in FIG. 3B, and the pictorial image y according to the second pictorial image data $D_2$ is schematically illustrated in FIG. 3C. As will be understood from FIG. 3A showing both of the pictorial images x and y in one frame, the pictorial image y is shifted from the pictorial image x by a distance corresponding to the velocity of the fluid 2 in the flow direction of the fluid 2, and the pictorial image y partially overlaps the pictorial image x.

Figure 3D:
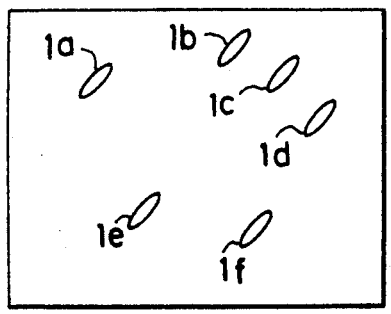
FIG. 3D is a view showing the respective particle pathline images in the single image shown in FIG. 3B.
Figure 3E:
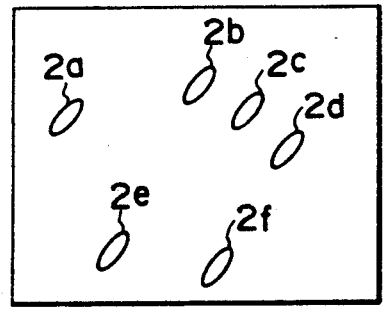
FIG. 3E is a view showing the respective particle pathline images in the single image shown in FIG. 3C.

The respective particle pathline images, all of which correspond to a single image typically designated by the reference x in FIG. 3B, are illustrated in detail in FIG. 3D, and the respective particle pathline images, all of which correspond to a single image typically designated by the reference y in FIG. 3C, are illustrated in detail in FIG. 3E.

In the description given hereafter, the pictorial image corresponding to the first pictorial image data $D_1$ will be referred to as the first flow-field image and the pictorial image corresponding to the second pictorial image data $D_2$ will be referred to as the second flow-field image.

Returning to FIG. 2, the operation moves to step 24, in which the first pictorial image data $D_1$ is subjected to thresholding using an appropriate threshold level to obtain first binary image data Da and the second pictorial image data $D_2$ is also subjected to thresholding to obtain second binary image data Db.

In the following step 25, the first and second binary image data Da and Db are subjected to noise reduction for removing undesired information. The noise reduction operation executed in step 25 includes the following processes.

a) Process for removing data concerning all of the particle pathline images in the first and second flow-field images, which are in contact with the corresponding outer periphery of the first or second flow-field image.

b) Process for removing the undesired data present on the periphery of the respective particle pathline images in the first and second flow-field images by a contraction and an expansion process.

c) Process for removing the data concerning the particle pathline images composed of less than a prescribed number of picture images in the first and second flow-field images.

The noise reduction is, however, not limited to only the foregoing three process and other process may be added if necessary. Alternatively, only one or two among these three processes may be used. That is, any appropriate process or processes can be employed instead of, or in addition to, these three processes.

The operation further moves to step 26, in which all of the data corresponding to the particle pathline images which have not been removed by the noise reduction in step 25 are labeled. In this embodiment the pathline images appearing in the first particle flow-field image are labeled by a series of references $1a, 1b, \ldots$ as shown in FIG. 3D and the particle pathline images appearing in the second flow-field image are labeled by another series of references $2a, 2b, \ldots$ as shown in FIG. 3E.

Then, the operation moves to step 27, in which the centers of gravity and the areas of all of the images labeled in step 26 are calculated. In the following step 28 the logical products are calculated between the pieces of labeled particle pathline image data of the first pictorial image data $D_1$ and the pieces of labeled particle pathline image data of the second pictorial image data $D_2$.

After this, the operation moves to step 29, in which the correspondence between the pieces of labeled particle pathline image data of the first pictorial image data $D_1$ and the pieces of labeled particle pathline image data of the second pictorial image data $D_2$ is determined on the basis the result of the logical products calculated in step 28, in the following manner.

Figure 4:
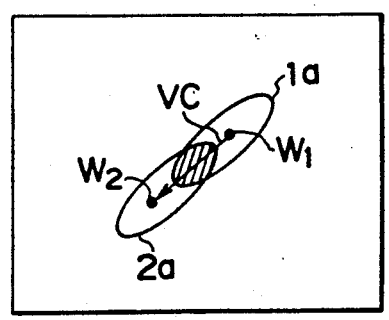
FIG. 4 is a view illustrating the geometric relationship between a pair of particle pathline images.

At first, all combinations of the particle pathline image data, the resulting logical product of which is significant, are listed up to be further checked. The logical product between two pieces of particle pathline image data is significant when the images overlap. In the case where, for example, the labeled particle pathline image $1a$ is related to the labeled particle pathline image $2a$ and the image $1a$ overlaps the image $2a$ as shown in FIG. 4, the logical product between the two pieces of data corresponding to the images $1a$ and $2a$ the area of the overlapped portion, which is indicated by hatching in FIG. 4. It is determined that a pair of the particle pathline images has been identified from the travel of the same particle when the overlapping area is greater than zero. Accordingly, the pair of image data labeled $1a$ and $2a$ is obtained as a significant data combination. The operations described above are carried out for all combinations of the pieces of pathline image data to determine which combinations are significant.

The operation then moves to step 30, in which discrimination is made as to whether or not each combination of the pathline image data determined as a significant combination in step 29 satisfies the following conditions, in order to check the validity of the combinations:

i) Each piece of pathline image data in the first pictorial image data $D_1$ is combined with only one piece of pathline image data in the second pictorial image data $D_2$.

ii) The difference in area between two combined particle pathline images is less than 20%.

iii) The straight line passing through the centers of gravity of the combined particle pathline images passes through an image formed by superimposing the combined particle pathline images.

In step 30 only the combinations of the particle pathline images which satisfy all of the conditions i) to iii) are determined as valid combinations and if even one of the conditions i) to iii) is not satisfied, the combination is rejected as not being valid. Thus, only the valid combinations are selected from among the combinations obtained in step 24.

The operation moves to step 31, in which a vector VC is calculated for each combination selected in step 30. The vector VC is defined as a vector extending from the center of gravity of the particle pathline image of the first flow-field image to that of the second flow-field image. For example, in the case of FIG. 4, the velocity vector of the fluid 2 at that time point extends from the center of gravity $W_1$ of the image $1_a$ to the center of gravity $W_2$ of the image $2_a$. The vector VC determined as described above represents the velocity of the fluid 2 at that point. The calculation for obtaining the vector is carried out for all of the combinations selected in step 30, whereby velocity vectors of the fluid 2 can be obtained for many points in the flow field 4.

In the following step 32 the distribution of the velocity of the fluid 2 in the flow field 4 is calculated from the result in step 31 to obtain data representing the distribution as output data OD. The output data OD is then sent to a printer 5 in step 33 to be printed out. It can also of course be displayed visually on a cathode ray tube or other such display device.

With the system in FIG. 1, in which the video output signal produced by the shutterless image pickup tube type interlaced scanning television camera is used, the correspondence between the particle pathline images in the first flow-field image and that of the second flow-field image can be easily obtained merely by calculating the logical product therebetween. Accordingly, the data processing operation carried out in the system 10 is not affected by noise and the reliable velocity measurement of the fluid 2 can be attained by a simple processing operation.

As will be understood from the foregoing description, a shutterless interlaced scanning type television camera having a MOS type image pickup element or a frame integration type CCD video camera instead of the television camera 11 can also be used with the same effect.

Figure 7:
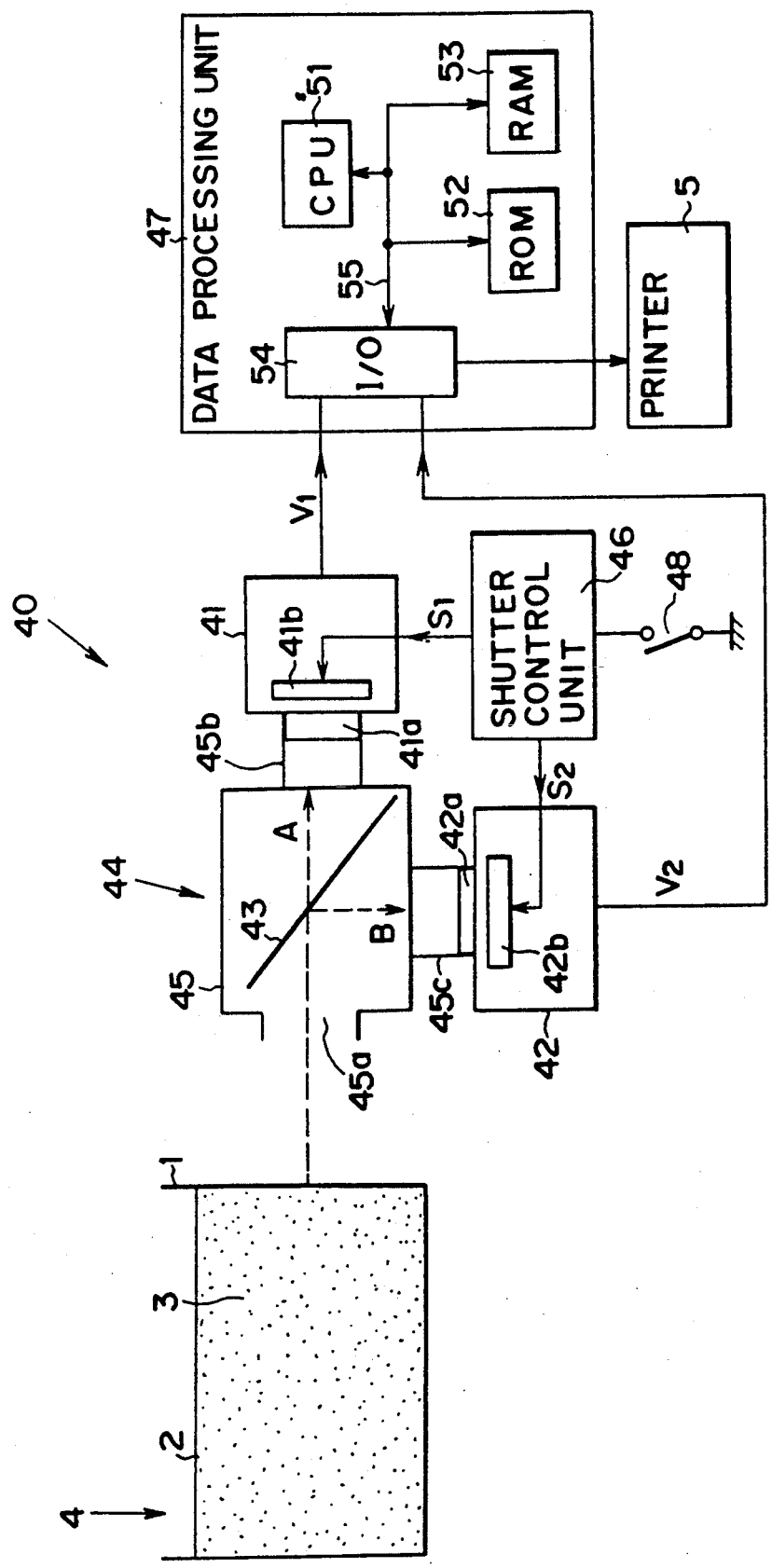
FIG. 7 is a schematic view showing another embodiment of a velocity measurement system according to the present invention.

FIG. 7 is a schematic view of another velocity measurement system 40 according to the present invention, which is capable of measuring the velocity of a fluid traveling at high speed. The velocity measurement system 40 is arranged to measure the velocity of the fluid 2 in the visualized flow field 4 defined in the tank 1 in a manner similar to the system 1 shown in FIG. 1. The velocity measurement system 40 has a first image pickup apparatus 41 and a second image pickup apparatus 42, which are for imaging a visualized flow field 4 in the tank 1 within the same field of view. The exposure time periods of these image pickup apparatuses 41 and 42 are controlled by a shutter control unit 46 so as to partially overlap.

Each of the image pickup apparatuses 41 and 42 is a CCD shutter type television image pickup apparatus and an optical device 44 having a half mirror 43 is employed to provide the same fields of view to both. The optical device 44 has a light shielding box 45 in which the half mirror 43 is mounted as illustrated in FIG. 7, and an entrance window 45a of the light shielding box 45 is directed to face the flow field 4 in the tank 1 being imaged. Lens-barrels 41a and 42a of the image pickup apparatuses 41 and 42 are coupled with the light shielding box 45 by means of light-shielding ducts 45b and 45c, whereby the light entering through the entrance window 45a is split into a light component A passing through the half mirror 43 and advancing to the first image pickup apparatus 41, and a light component B reflected by the half mirror 43 and advancing to the second image pickup apparatus 42.

The optical device 44 is designed to forward a picture of the flow field to the first and second image pickup apparatuses 41 and 42 within one and the same field of view. Consequently, the first pictorial image of the flow field 4 obtained by the first image pickup apparatus 41 is identical in field of view with the second pictorial image of the flow field 4 obtained by the second image pickup apparatus 42. So long as the two images are obtained at the same time, the second pictorial image is identical with the first pictorial image data inverted in either the right-left direction or the up-down direction with respect thereto.

Therefore, to simplify the comparison of the first and second pictorial images, one of them is inverted by a mapping operation in a data processing unit 47. In addition, in this embodiment the data processing unit 47 also electronically corrects the visual field of the second pictorial image to match that of the first pictorial image, if necessary. This matching can also be achieved by providing a mechanical type adjusting device for correcting the visual field of the second pictorial image in the optical device 44, either in addition to or instead of to the electronic correction. Such correction of the field of view is not needed if the optical device 44 is perfectly aligned in manufacturing.

The shutter control unit 46 produces a first control signal $S_1$ for controlling the opening/closing of a shutter 41b of the first image pickup apparatus 41 and a second control signal $S_2$ for controlling the opening/closing of a shutter 42b of the second image pickup apparatus 42. A switch 48 is connected with the shutter control unit 46, and the shutter control unit 46 is triggered to produce the first and second control signals $S_1$ and $S_2$ upon closing of the switch 48. The waveforms of the first and second control signals $S_1$ and $S_2$ are shown in FIGS. 8A and 8B.

Referring to FIG. 9, the shutter control unit 46 is composed of a first pulse generator 49 and a second pulse generator 50, each of which is constituted as a one-shot multi-vibrator. The first pulse generator 49 produces a single pulse of pulse width $T_a$ as the first control signal $S_1$ and the second pulse generator 50 produces a single pulse of pulse width $T_a+T_b$ as the second control signal $S_1$ in response to the closing of the switch 48.

Explanation will be now given to the shutter control operation of the respective image pickup apparatuses 41 and 42 by the first and second control signals $S_1$ and $S_2$. The level of the first control signal $S_1$ changes from low to high when the switch 48 is closed at time $t_0$, and the established high level state is maintained until $t_1$. at which time period $T_a$ has passed from $t_0$ (see FIG. 8A). The shutter 41b of the first image pickup apparatus 41 is opened during the high level state of the first control signal $S_1$, that is, between $t_0$ and $t_1$. On the other hand, the level of the second control signal $S_2$ changes from low to high when the switch 48 is closed at time $t_0$, and the established high level state of the second control signal $S_2$ is maintained until $t_2$, at which time period $T_a+T_b$ has passed from $t_0$ (see FIG. 8B). The shutter 42b of the second image pickup apparatus 42 is kept open during the high level state of the second control signal $S_2$, that is between $t_o$ and $t_2$.

As will be understood from the foregoing description, both of the image pickup apparatuses 41 and 42 receive light between $t_0$ and $t_1$, and only the second image pickup apparatus 42 is continues to receive light until $t_2$. Specifically, the exposure time period of the second image pickup apparatus 42 is different from but overlaps with that of the first image pickup apparatus 41. In other word, a part of the exposure time period of the second image pickup apparatus 42 overlaps at least part of the exposure time period of the first pickup apparatus 41.

Returning to FIG. 7, a first television video signal $V_1$ is produced by the first image pickup apparatus 41 whose exposure time is controlled by the first control signal $S_1$, and a second television video signal $V_2$ is produced by the second image pickup apparatus 42 whose exposure time is controlled by the second control signal $S_2$. The first and second television video signals $V_1$ and $V_2$ are supplied to the data processing unit 47 constituted as a conventional microcomputer and are processed for measuring picture parameters in accordance with an image processing program 60 stored in the data processing unit 47.

The data processing unit 47 includes a central processing unit (CPU) 51, read-only memory (ROM) 52, random access memory (RAM) 53 and I/O interface 54, which are interconnected by a bus 55 to form a conventional microcomputer system. The I/O interface 54 receives the television video signals $V_1$ and $V_2$, and the image processing program 60 for measurement of picture parameters represented by the first and second television video signals $V_1$ and $V_2$ is stored in the ROM 52.

Figure 10:
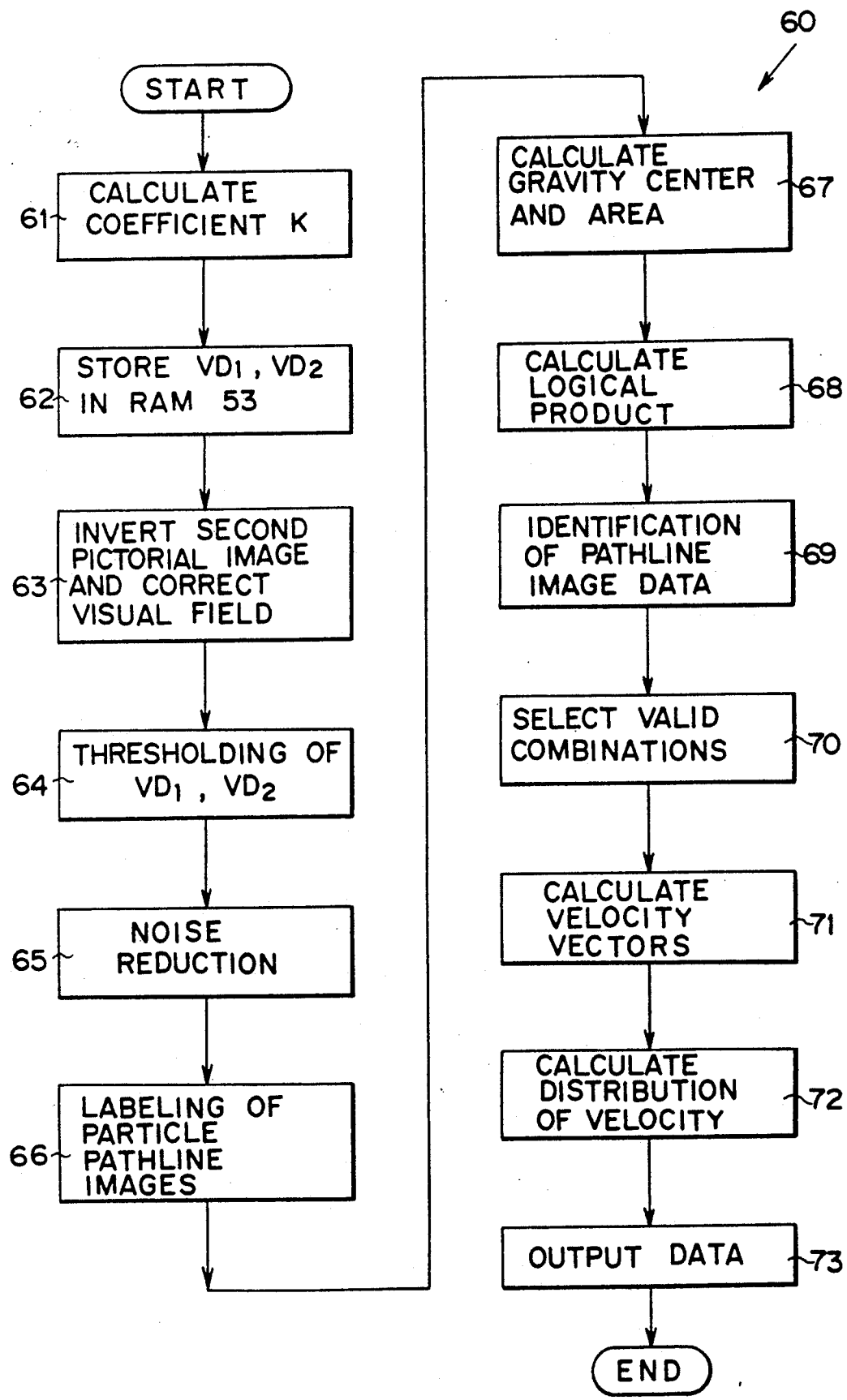
FIG. 10 is a flowchart of the image processing program executed in the data processing unit shown in FIG. 7.

The measurement of picture parameters for analyzing the velocity of the fluid 2 in the flow field 4 according to the image processing program 60 stored in the ROM 52 will now be explained with reference to FIG. 10.

After the start of the execution of the data processing program 60, the data processing unit 47 is initialized and the operation moves to step 61, in which a correction coefficient K is calculated. The correction coefficient K is for correcting the visual field of the second pictorial image so as to match it with that of the first pictorial image if there is any difference therebetween. In this case, the difference in visual field between the first and second pictorial images is detected by the use of a test pattern (not shown) and the correction coefficient K is calculated from the resulting data.

The operation then moves to step 62, in which the first and second television video signals $V_1$ and $V_2$ are fetched into the data processing unit 47 and are converted into digital form by an analog-digital converter (not shown) in the I/O interface 54 to obtain first video data $VD_1$ corresponding to the first television video signal $V_1$ and second video data $VD_2$ corresponding to the second television video signal $V_2$. The first and second video data $VD_1$ and $VD_2$ are stored in the RAM 53.

In the following step 63 the second video data $VD_2$ is processed to obtain inverted second video data $IVD_2$ which represents an inverted second pictorial image, and the inverted second video data $IVD_2$ is stored in the RAM 53. The inverted second pictorial image is matched with the first pictorial image represented by the first video data $VD_1$. Then, if necessary, the inverted second video data $IDV_2$ is corrected by the use of the correction coefficient K to obtain a pictorial image within the same visual field as that of the first pictorial image.

Figure 11A:
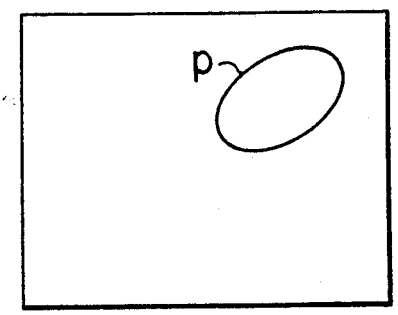
FIG. 11A is a view schematically illustrating the first image according to the first video data obtained in the data processing unit shown in FIG. 7 as a single image.
Figure 11B:
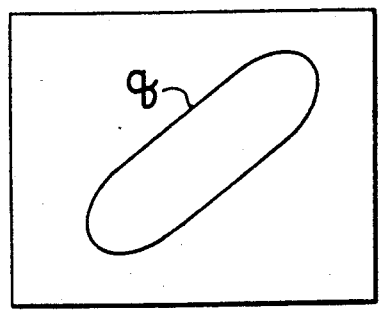
FIG. 11B is a view schematically illustrating the second image according to the second video data obtained in the data processing unit shown in FIG. 7 as a single image.
Figure 11C:
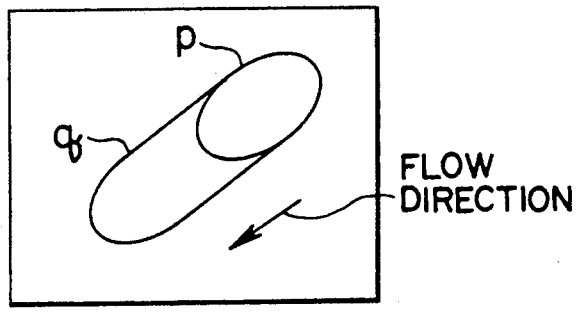
FIG. 11C is a view schematically illustrating the relationship between the first and second images.

The pictorial image p represented by the first video data $VD_1$ is schematically illustrated in FIG. 11A, and the pictorial image q represented by the inverted second video data $IVD_2$ is schematically illustrated in FIG. 11B. As will be understood from FIG. 11C showing both of the pictorial images p and q in one and the same frame, the pictorial image q is elongated by a distance corresponding to the velocity of the fluid 2 in the flow direction of the fluid 2 and the part of the pictorial image q obtained in the exposure time period $T_a$ overlaps the pictorial image p.

Figure 12A:
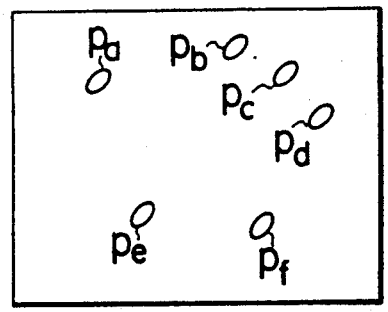
FIG. 12A is a view showing the respective particle pathline images in the first image shown in FIG. 11A.
Figure 12B:
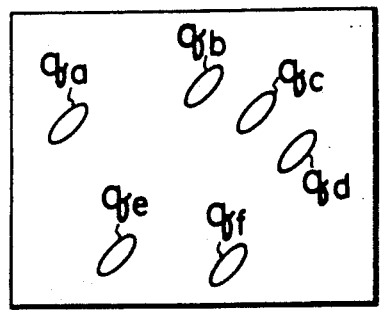
FIG. 12B is a view showing the respective particle pathline images in the second image shown in FIG. 11B.

The respective particle pathline images, all of which correspond to a single image typically designated by the reference p in FIG. 11A, are illustrated in detail in FIG. 12A, and the respective particle pathline images, all of which correspond to a single image typically designated by the reference q in FIG. 11B, are illustrated in detail in FIG. 12B.

In the description given hereafter, the pictorial image corresponding to the first video data $VD_1$ will be referred to as a first image and the pictorial image corresponding to the inverted second video data $IVD_2$ will be referred to as a second image.

Returning to FIG. 10, the operation moves to step 64, in which the first video data $VD_1$ is subjected to thresholding using an appropriate threshold level to obtain first binary data $D_p$ and the inverted second video data $IDV_2$ is also subjected to thresholding to obtain second binary data $Dg$.

In the following step 65, the first and second binary data Dp and Dq are subjected to noise reduction for removing undesired information. The noise reduction operation executed in step 65 includes processes similar to those used in step 25 of the program 20 shown in FIG. 2. The processes for noise reduction are as follows:

a) Process for removing data concerning all of the particle pathline images in the first and second images, which are in contact with the corresponding outer periphery of the first or second image.

b) Process for removing the undesired data present on the periphery of the respective particle pathline images in the first and second images by a contraction and an expansion.

c) Process for removing the data concerning the particle pathline images composed of less than a prescribed number of picture images in the first and second images.

The operation moves to step 66, in which all of the data corresponding to the particle pathline images which have not been removed by the noise reduction in step 65 are labeled. In this embodiment the particle pathline images appearing in the first image are labeled by a series of references pa, pb, ... as shown in FIG. 12A and the particle pathline images appearing in the second image are labeled by another series of references $q_a$, $q_b$, ... as shown in FIG. 12B.

The operation moves to step 67, in which the centers of gravity and the areas of all of the images labeled in step 66 are calculated. In the following step 68 the logical products are calculated between the pieces of labeled particle pathlines image data of the first video data $VD_1$ and the pieces of labeled particle pathline image data of the inverted second video data $IDV_2$.

Figure 2:
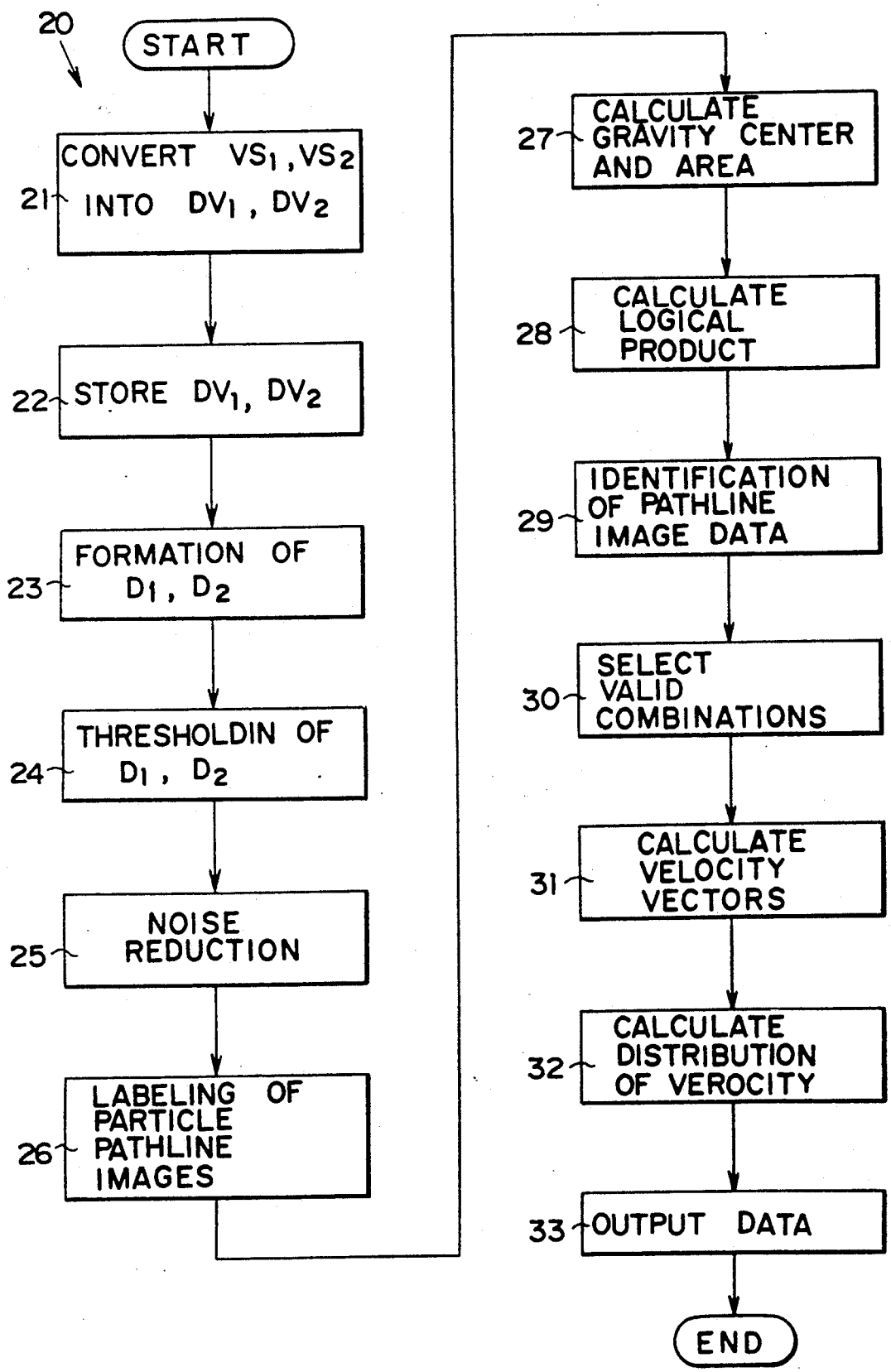
FIG. 2 is the flowchart of a data processing program executed in the microcomputer shown in FIG. 1.

The operation moves to step 69, in which the correspondence between the pieces of labeled particle pathline image data of the first video data $VD_1$ and the pieces of labeled particle pathline image data of the inverted second video data $IDV_2$, is determined on the basis of the result of the logical product calculated in step 68 in a manner similar to that of step 29 of the program 20 shown in FIG. 2.

That is, at first, all combinations of the particle pathline image data, the resulting logical product of which is significant, are listed up to be further checked. The logical product between two pieces of particle pathline image data is significant when the images overlap. In the case where, for example, the labeled particle pathline image $p_a$ is related to the labeled particle pathline image $q_a$ and the image $p_a$ overlaps the image $q_a$ as shown in FIG. 11, the logical product between the two pieces of data corresponding to the images $p_a$ and $q_a$ represents the area of the overlapped portion, which is indicated by hatching in FIG. 11. It is determined that a pair of the particle pathline images has been identified from the travel of the same particle when the overlapped area is greater than zero. Accordingly, the pair of image data labeled $p_a$ and $q_a$ is obtained as a significant data combination. The operations described above are carried out for all combinations of the pieces of pathline image data to determine which combinations are significant.

The operation then moves to step 70, in which discrimination is made as to whether or not each combination of the pathline image data determined as a significant combination in step 69 satisfies the following condition in order to check the validity of the combinations:

i) Each piece of pathline image data in the first video data $VD_1$ is combined with only one piece pathline image data in the inverted second video data $DV_2$.

In step 70 only the combinations of the particle pathline images which satisfy the condition i) are determined as valid combinations. Thus, only the valid combinations are selected from among the combinations obtained in step 69.

Figure 13:
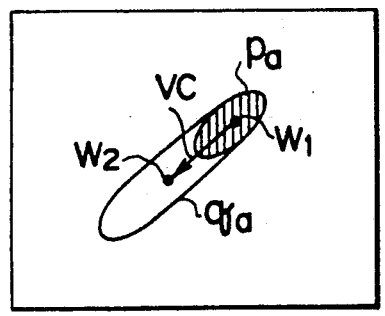
FIG. 13 is a view illustrating the geometric relationship between a pair of particle pathline images.

The operation moves to step 71, in which a vector VC is calculated for each combination selected in step 70. The vector VC is defined as a vector extending from the center of gravity of the particle pathline image of the first image to that of the second image. For example, in the case of FIG. 13, the velocity vector of the fluid 2 at that time point extends from the center of gravity $W_1$ of the image $p_a$ to the center of gravity $W_2$ of the image $q_a$. The vector VC determined as described above represents the velocity of the fluid 2 at that point. The calculation for obtaining the vector is carried out for all of the combinations selected in step 70, whereby velocity vectors of the fluid 2 can be obtained for many points in the flow field 4.

In the following step 72 the distribution of the velocity of the fluid 2 in the flow field 4 is calculated from the result in step 71 to obtain data representing the distribution as output data OD. The output data OD is then sent to a printer 5 in step 73 to be printed out. It can also of course be displayed visually on a cathode ray tube or other such display device.

With the velocity measurement system 40 shown in FIG. 7, since two CCD shutter type image pickup apparatuses 41 and 42 are used and the exposure timings thereof can be regulated by the shutter control unit 46 so as to vary the overlap time $T_a$, it is possible to adjust the overlap time $T_a$ so as to obtain a significant logical product between the particle pathline images even if the velocity of the particles in the flow field is too high to measure by the system 10 shown in FIG. 1. This possibility results from the fact that the measurement time of the velocity measurement system 40 is not limited by the television picture sampling period of the NTSC system.

In addition, if the television cameras 41 and 42 are located far enough from the tank 1 for the optical paths from the tank 1 to the television cameras to be substantially parallel, the optical device 44 shown in FIG. 7 is not essential for obtaining pictorial images identical in field of view.

Of course, even in this case, the correction for matching of the fields of view may be carried out if necessary. However, the data processing for inverting one of the pictorial images is not needed.

What is claimed is:

1. A method for measuring fluid velocity in a fluid flow field as observed within a two-dimensional visual field on the basis of particle pathline image information in the flow field visualized by the injection of tracer particles, said method comprising the steps of:

obtaining a television video signal by imaging the visualized flow field by the use of an interlaced scanning pickup tube type television camera;

forming first pictorial image data on the basis of a first field picture signal in the television video signal, said first pictorial image data being composed of a first field pictorial image of one television picture frame;

forming second pictorial image data on the basis of a second field picture signal paired with the first field picture signal in the television video signal, the second pictorial image data being composed of a second field pictorial image of said television picture frame;

calculating logical products between the first and second pictorial image data;

determining correspondence between members of a group of particle pathline images of the first pictorial image data and members of a group of particle pathline images of the second pictorial image data on the basis of an overlap condition among said first and second pathline images identified by the logical products obtained in the calculating step; and, calculating a flow velocity vector from at least one corresponding pair of particle pathline images determined in the determining step.

2. A method as claimed in claim 1, wherein the television video signal is separated into an odd field video signal and an even field video signal and the first pictorial image data is made from one odd field picture signal in the odd field video signal.

3. A method as claimed in claim 2, wherein the first pictorial image data is constructed as data for one television picture frame by inserting scanning line image data based on the odd field picture signal so as to interpolate even field scanning lines.

4. A method as claimed in claim 1, wherein the television video signal is separated into an odd field video signal and an even field video signal and the second pictorial image data is made from one even field picture signal in the even field video signal.

5. A method as claimed in claim 4, wherein the second pictorial image data is constructed as data for one television picture frame by inserting scanning line image data based on the even field picture signal so as to interpolate odd field scanning lines.

6. A method as claimed in claim 1, wherein flow velocity vectors are calculated for a plurality of points in the flow field to determine a distribution of the velocity of the fluid in the flow field.

7. A method as claimed in claim 1, wherein the television video signal is obtained by imaging the visualized flow field by the use of a interlaced scanning type television camera.

8. A method as claimed in claim 1, wherein the television video signal is obtained by imaging the visualized flow field by the use of a frame integration type CCD video camera.

9. A method for measuring fluid velocity in a fluid flow field observed within a two-dimensional visual field on the basis of particle pathline image information in the flow field visualized by the injection of tracer particles, said method comprising the steps of:

obtaining a television video signal by imaging the visualized flow field by the use of an interlaced scanning pickup tube type television camera;

calculating logical products between pairs of field pictorial image data derived from a pictorial image frame of the obtained television video signal;

determining correspondence between particle pathline images of the pairs of field pictorial image data on the basis of an overlap condition among said first and second pathline images identified by the logical products obtained in the calculating step; and, calculating a flow velocity vector from each corresponding pair of particle pathline images determined in the determining step.

10. An apparatus for measuring fluid velocity in a fluid flow field observed within a two-dimensional visual field on the basis of particle pathline image information in the flow field visualized by the injection of tracer particles, said apparatus comprising:
- an interlaced scanning type television camera for producing a television video signal carrying a picture of the visualized flow field;
- means responsive to the television video signal for obtaining a pair of field picture signals for constructing one picture image frame;
- means for calculating logical products between first digital image data corresponding to one field picture signal and second digital image data corresponding to another field picture signal;
- means for determining correspondence between members of a group of particle pathline images of the first digital image data and members of a group of particle pathline images of the second digital image data on the basis of an overlap condition among said first and second pathline images identified by the logical products obtained in said calculating means; and,
- means for calculating a flow velocity vector from at least one corresponding pair of particle pathline images determined by said determining means.

11. An apparatus as claimed in claim 10, wherein the television camera is a interlaced scanning pickup tube type television camera.

12. An apparatus as claimed in claim 10, wherein the television camera is a interlaced scanning type television camera having a MOS type image pickup element.

13. A method for measuring a fluid velocity in a fluid flow field as observed within a two dimensional visual field on the basis of particle pathline image information in the flow field visualized by the injection of tracer particles, said method comprising the steps of:
- obtaining a first television signal by imaging the visualized flow field in a predetermined visual field by the use of a first CCD shutter type television image pickup apparatus during a first exposure time period;
- obtaining a second television signal by imaging the visualized flow field in the predetermined visual field by the use of a second CCD shutter type television image pickup apparatus during a second exposure time period a part of which overlaps at least part of the first exposure time period;
- forming first video data representing a first image corresponding to the first television signal;
- forming second video data representing a second image corresponding to the second television signal;
- calculating logical products between the first and second video data;
- determining correspondence between members of a group of particle pathline images of the first video data and members of a group of particle pathline images of the second video data on the basis of the logical products obtained in said calculating step; and
- calculating a flow velocity vector from at least one corresponding pair of particle pathline images determined by said determining step.

14. A method as claimed in claim 13, wherein light from the flow field is divided into two light components by the use of a half mirror and one of the light components is sent to each of the first and second CCD shutter type television image pickup apparatus.

15. A method as claimed in claim 14, wherein the image carried by one light component is inverted with respect to the image carried by the other light component, and the video data representing one of the images is inverted before said logical product calculating step.

* * * * *